United States Patent
Hu et al.

(10) Patent No.: US 9,138,965 B2
(45) Date of Patent: Sep. 22, 2015

(54) CONDUCTIVE FIBROUS MATERIALS

(75) Inventors: Liangbing Hu, Mountain View, CA (US); Jang Wook Choi, Daejeon (KR); Yuan Yang, Stanford, CA (US); Yi Cui, Stanford, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 681 days.

(21) Appl. No.: 12/916,053

(22) Filed: Oct. 29, 2010

(65) Prior Publication Data

US 2011/0200873 A1 Aug. 18, 2011

Related U.S. Application Data

(60) Provisional application No. 61/256,741, filed on Oct. 30, 2009.

(51) Int. Cl.
*H01M 4/64* (2006.01)
*H01M 4/66* (2006.01)
*H01M 4/74* (2006.01)
*H01M 4/75* (2006.01)
*H01M 10/02* (2006.01)
*B32B 15/16* (2006.01)

(52) U.S. Cl.
CPC ..................... *B32B 15/16* (2013.01)

(58) Field of Classification Search
CPC ....... H01M 10/00; H01M 10/02; H01M 4/64; H01M 4/663; H01M 4/665; H01M 4/666; H01M 4/667; H01M 4/80; B05D 5/12; H01G 9/004

USPC .................. 429/188, 211, 233, 235, 236, 245
See application file for complete search history.

(56) References Cited

U.S. PATENT DOCUMENTS

| 5,471,365 | A | * | 11/1995 | Nakamura et al. ............ 361/523 |
| 6,334,939 | B1 | | 1/2002 | Zhou et al. |
| 6,338,913 | B1 | | 1/2002 | Eshraghi |
| 7,553,371 | B2 | | 6/2009 | Dubrow et al. |
| 7,582,902 | B2 | | 9/2009 | Tano et al. |
| 2002/0110736 | A1 | * | 8/2002 | Kweon et al. .............. 429/231.1 |

(Continued)

FOREIGN PATENT DOCUMENTS

| CN | 1891668 A * 1/2007 |
| WO | WO 2008124167 A1 * 10/2008 |

OTHER PUBLICATIONS

Boredjiba et al., Direct Redox Deposition of Manganexe Oxide on Multiscaled Carbon Nanotube/Microfiber Carbon Electrode for Electrochemical Capacitor, Mar. 2009, Journal of the Electrochemical Society, 156, A378-A384.*

(Continued)

*Primary Examiner* — Sean P Cullen
(74) *Attorney, Agent, or Firm* — Crawford Maunu PLLC

(57) ABSTRACT

As consistent with various embodiments, an electronic device includes a fibrous material having a conductive coating thereon. The conductive coating includes conductive nanoparticles coupled to fibers in the fibrous material. The structure is implemented in connection with a variety of devices, such as a capacitive device or a battery. Other embodiments are directed to forming conductive fibrous sheets, in dispersing a nanomaterial in a solution and applying the solution to a fibrous sheet, such as commercial paper, to form a conductive sheet.

26 Claims, 11 Drawing Sheets

(56) References Cited

U.S. PATENT DOCUMENTS

| | | | |
|---|---|---|---|
| 2006/0052509 A1* | 3/2006 | Saitoh | 524/496 |
| 2006/0189113 A1 | 8/2006 | Vanheusden et al. | |
| 2006/0284537 A1 | 12/2006 | Tolt | |
| 2007/0048521 A1 | 3/2007 | Istvan | |
| 2008/0199696 A1* | 8/2008 | Kim et al. | 428/368 |
| 2008/0212261 A1 | 9/2008 | Ajayan et al. | |
| 2008/0254362 A1* | 10/2008 | Raffaelle et al. | 429/188 |
| 2009/0317710 A1* | 12/2009 | Douglas et al. | 429/163 |

OTHER PUBLICATIONS

Huang et al., Machine translation of CN 1891668 A, Jan. 2007.*

Petrik et al. "Hall Measurements on Carbon Nanotube Paper Modified With Electroless Platinum." Naoscale Res Lett 5:38-47 (2010; published online Sep. 18, 2009).

Agarwal et al. "Conductive paper from lignocelluloses wood microfibers coated with a nanocomposite of carbon nanotubes and conductive polymers." Nanotechnology 20:1-8 (2009).

Hu et al. "Stretchable, Porous and Conductive Energy Textiles." NANOLetters 10:708-714 (2010). Publication of Appendix A to Provisional Application (U.S. Appl. No. 61/256,741).

Hu et al. "Highly conductive paper for energy-storage devices." PNAS Early Edition, 5 pgs. (print Dec. 7, 2009). Publication of Appendix C to Provisional Application (U.S. Appl. No. 61/256,741).

2011 Hu et al. "Lithium-Ion Textile Batteries with Large Areal Mass Loading." Adv. Engery Mater., 6 pgs., wileyonlinelibrary.com (2011).

V. Pushparaj et al. Flexible energy storage devices based on nanocomposite paper. Proceedings of the National Academy of Sciences of the USA, 104(34), 13574-13577 (Aug. 2007).

\* cited by examiner

CONDUCTIVE FIBROUS MATERIALS

RELATED PATENT DOCUMENTS

This patent document claims the benefit, under 35 U.S.C. §119(e), of U.S. Provisional Patent Application Ser. No. 61/256,741 filed on Oct. 30, 2009, and entitled "Conductive Fibrous Sheets;" this patent document and the Appendices A-C filed in the underlying provisional application are fully incorporated herein by reference.

FEDERALLY-SPONSORED RESEARCH AND DEVELOPMENT

This invention was made with Government support under contract N00014-08-1-0713 awarded by the Office of Naval Research. The U.S. Government has certain rights in this invention.

FIELD OF INVENTION

The present invention relates to conductive sheets, and more particularly, to fibrous sheets of material coated with a conductive layer.

BACKGROUND

Conductive materials are used in a multitude of electronic devices for a variety of purposes. Many applications benefit from relatively thin conductive materials, due to one or more of shape, size or properties relative to such materials.

One type of thin conductive material that has seen extensive use involves materials having a base layer, such as a polymer or glass-type layer, with a conductive surface material. For instance, printable solution processing has been exploited to deposit various nanomaterials such as fullerenes, carbon nanotubes (CNTs), nanocrystals and nanowires for large-scale applications including thin-film transistors, solar cells and energy storage devices due to the low cost of these processes while attaining properties of those nanomaterials. In these processes, flat substrates such as glass, metals, Si wafer, and plastics have been used to hold nanostructure films Nanostructured materials are often capped with surfactant molecules to disperse the materials as separated particles in a solvent to form an "ink." The ink is deposited onto flat substrates and followed by surfactant removal and solvent evaporation processes.

To produce high-quality films, significant efforts have been spent on ink formulation and rheology adjustment. In glass and plastics, the ink surface tension needs to match with substrates, and viscosity must be high enough to avoid surface tension-driven defects such as ring and dewetting in coating and drying processes. Therefore, various additives are incorporated in ink to tune the rheology properties. These insulating additives decrease the final film conductivity. Moreover, since surfactants are normally insulating and thus limit the charge transfer between nanomaterials, their removal can be particularly critical to resulting device performance. However, removing surfactants can involve extensive washing and chemical displacement, which often causes mechanical detachment of the film from the flat substrate. While polymer binders or adhesives can be used to improve the binding of nanomaterials to substrates, they tend to decrease the film conductivity further.

These additional procedures increase the complexity of solution processing, and result in high cost and low throughput. These and other considerations remain challenging to the design, formation and implementation of conductive materials.

SUMMARY

Various aspects of the present invention are directed to devices, methods and systems involving a conductive sheet having a coated fibrous material, in a manner that addresses challenges including those discussed above.

According to an example embodiment, an electronic device includes a fibrous planar material, such as a planar sheet, and a conductive coating. The planar sheet has opposing surfaces and extends to a length and width in a plane. The conductive coating is on a first surface of the planar sheet and has conductive nanoparticles coupled to fibers at the first surface.

Another example embodiment is directed to a multilayer battery device having anode-side and cathode-side components separated by an electrolytic separator. An anode-side fibrous planar sheet or material has a conformal conductive coating on an upper surface, the coating having conductive nanoparticles coupled to fibers in the planar sheet. An anode layer (e.g., having material such as $Li_4Ti_6O_2$) is on the conductive coating of the fibrous planar sheet, and the electrolytic separator layer is on the anode layer. A cathode layer (e.g., having material such as $LiMn_2O_4$) is on the separator layer, and a cathode-side fibrous planar sheet is on the cathode layer, with a conformal conductive coating on a lower surface adjacent the cathode layer, the coating having conductive nanoparticles coupled to fibers in the planar sheet.

Other example embodiments are directed to multilayer capacitive devices having first and second conductive sheet layers, respectively having a fibrous material coated with a conductive layer, separated by a separator layer between the first and second conductive sheet layers. The coated conductive layers of each of the first and second sheets respectively contact the separator layer.

Another example embodiment is directed to a battery having a fibrous planar sheet with opposing surfaces and extending to a length and width in a plane, the length and width being an order of magnitude greater than the thickness of the sheet between the opposing surfaces. A conformal conductive coating is located on the planar substrate and has conductive nanoparticles coupled to fibers in the planar sheet. A conductive lead is at an end of the planar sheet, and a conductive strip coating is on the planar sheet and extends across the sheet to collect current from the sheet and conduct the collected current to the conductive lead.

Another example embodiment is directed to a method of making a conductive sheet. Conductive materials are dispersed in solution and the solution is applied to a surface of a fibrous sheet to couple the conductive materials to fibers on the surface and form a conductive layer thereon.

In connection with another example embodiment, a method of making a multilayer battery device is as follows. Conductive materials are dispersed in solution, and the solution is applied to a surface of fibrous sheets to couple the conductive materials to fibers on the surface of the sheets and form conductive coatings thereon. An anode layer is formed on the coated surface of a first one of the coated sheets to electrically couple the anode layer to the coated surface of the first one of the coated sheets. An electrolyte separator layer is provided on the anode layer, and a cathode layer is provided on the electrolyte separator layer. A second one of the coated sheets is provided on the cathode layer to electrically couple the anode layer to the coated surface of the second one of the coated sheets.

The above summary is not intended to describe each embodiment or every implementation of the present disclosure. The figures and detailed description that follow more particularly exemplify various embodiments.

BRIEF DESCRIPTION OF THE DRAWINGS

The invention may be more completely understood in consideration of the following detailed description of various embodiments of the invention in connection with the accompanying drawings, in which.

Figure 1A:
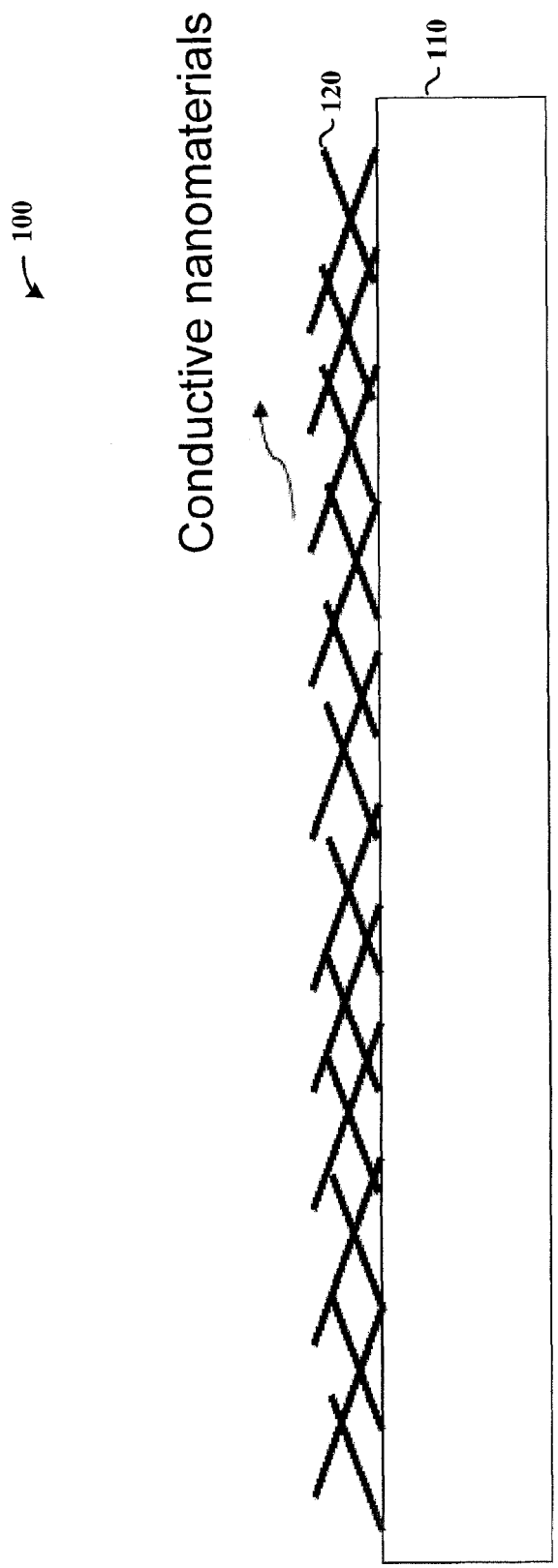
FIG. 1A shows a conductive fibrous sheet, consistent with an example embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention including aspects defined in the claims.

DETAILED DESCRIPTION

The present invention is believed to be useful for applications involving conductive sheets, such as fibrous sheets, and their use in a variety of electronic applications. While the present invention is not necessarily limited to such applications, various aspects of the invention may be appreciated through a discussion of various examples using this context.

According to an example embodiment, a fibrous material or sheet (e.g., paper, textile) is coated with a conductive nanomaterial that couples to fibers in the fibrous material or sheet to form a conductive material or sheet. The conductive materials may include, for example, single walled carbon nanotubes, multiwalled carbon nanotubes, metal nanowires, metal nanoparticles, and/or transparent and conductive oxide (TCO) nanoparticles, some or all of which may be formed in a generally one-dimensional configuration. The nanomaterial can be dispersed in a solution and coated onto a sheet to form a conformal coating onto fibers in the sheet. The application of the nanomaterials, in one or more of thickness, composition and arrangement, is controlled to set the conductivity and/or resistance of the sheet (e.g., between 0.1 Ohm/sq and 10 MOhm/sq).

The fibrous materials as discussed herein may be implemented using a variety of different types of materials. For example, a matrix or bundle of fibers may be coated with a conductive material. This coated matrix or bundle may further be loaded with other materials, such as conductive, capacitive, pseudocapacitive or electrolyte materials (e.g., organic or aqueous electrolyte). These loaded materials may have one or more of a variety of different types of sizes and shapes. For example, the loaded materials may have cross-sections that are less than openings between fibers in which the materials are located (e.g., less than openings of about 1 micrometer), and may be of a shape such as a sphere, cube, hexagon, triangle, wire or tube. In some applications, the loaded materials and/or conductive coating includes a semiconductor, a metal, a material having a resistivity in the range of $10^5$ ohm cm to $10^{-7}$ ohm cm, and/or a heterostructure having a combination of two or more materials. In certain applications, the loaded materials and/or conductive coating include at least one of an insulating material coated with a conducting shell, and a conducting material coated with an insulating shell. In addition, coatings on the fibers may vary in thickness, and in some implementations, include coatings of a thickness of between about 5-500 nanometers.

In connection with these and other embodiments, it has been discovered that applying a conductive coating of nanomaterials to a fibrous material such as a sheet, such as paper or textiles, can overcome issues such as those described above in connection with the application of such a conductive coating to polymers. It has also been discovered that supercapacitors based on coated fibrous materials (e.g., carbon nanotube conductive paper) show performance with a specific capacitance of 200 F/g, a specific energy of 47 Wh/kg (which is comparable to that of rechargeable batteries), a high specific power of 200,000 W/kg, and a stable cycling life over 40,000 cycles.

The following discussion includes reference to various documents/reference materials, by way of numerals in parenthesis that refer to cited references listed below. These references include general information regarding a variety of discussion herein, and in some instances, specific information to which one more example embodiments discussed herein may apply. Each of these references is fully incorporated herein by reference.

Conductive materials and sheets as discussed herein can be used in a variety of electronic applications, such as with thin-film transistors (1-3), solar cells (4, 5) energy storage devices (6, 7), and batteries, in which the conductive paper and textile are used as the highly conductive current collector. In some applications, a conductive nanomaterial is coated on a fibrous sheet in a pattern to form an electric circuit for applications such as a dye solar cell and battery as discussed herein, as well as others.

In one embodiment, a supercapacitor includes a fibrous paper sheet coated with carbon nanotube material that forms a supercapacitor conductive sheet. The carbon nanotubes form electrodes of the supercapacitor. In some implementations, the supercapacitor includes pseudocapacitor materials in the carbon nanotube coating. In accordance with these implementations, a pseudocapacitor is a material that facilitates the storage of charge in an electrochemically reversible change in oxidation state. Such pseudocapacitor materials include, for example, one or more of conductive polymers, Ruthenium Oxide ($RuO_2$), Manganese Oxide ($MnO_2$) and others.

In another embodiment, a printed electronic device includes a coated paper and/or textile sheet, such as a coated textile-based sheet configured for wearing as a garment. In connection with these embodiments, nanomaterials are placed in a solution to form an ink that is applied to paper, textiles or other fibrous materials (e.g., as a dye) (13). This ink application uses strong adhesion characteristics of the ink as relative to the fibrous material, resulting from three-dimensional hierarchical porous fiber structures, surface charges and functional groups in the fibrous material (9). Nanomaterials whose size is comparable to ink pigments (100~300 nm) can be used to provide strong adhesion while maintaining their unique intrinsic properties for device applications.

In a particular embodiment, aqueous carbon nanotube (CNT) ink with sodium dodecylbenzenesulfonate (SDBS) as surfactants is used (10), where SDBS and CNT are 10 and 1-5 mg/mL in concentration, respectively. CNT ink is applied onto paper by Mayer rod coating, turning the paper into highly conductive paper with low sheet resistance of around 10 Ohm/sq. by controlling the paper type and ink composition. Resistance can be achieve that is lower than other approaches by several orders (11). The porous structure of paper is used to induce a large capillary force for the ink, and thus facilitate high contacting surface area of flexible nanotubes to paper after the solvent is taken by paper. Other implementations are directed to the use of an ink having different or additional nanoscale materials, such as Silver nanowires (12). Using a conformal coating approach as discussed herein, sheet resistances of about 1 Ohm/sq for Silver nanowires can be achieved at an effective film thickness of about 500 nm.

In many implementations, a CNT (or other nanoparticle) ink is applied without additives to adjust the rheology, which simplifies the process and leads to high film conductivity, further addressing issues including those discussed in the Background above. In addition, where paper is used as a fibrous material upon which a coating is applied, any surfactant washing process (such as used to achieve high film conductivity) can be avoided, which also addresses issues as discussed above.

In connection with other example embodiments, it has also been discovered that a conductive sheet, such as a coated commercially-available paper sheet as described herein, has desirable mechanical properties including bending, damage stability and others. For example, CNTs coated onto paper can be bent down to small (e.g., 2 mm) radii while maintaining electrical conductivity, using the flexibility of individual CNTs in the sheet together with strong binding of CNTs with paper fibers and the porous morphology in paper that releases bending strain. The resulting strong adhesion of CNT to paper is used to promote high film stability against damage such as scratching and peeling-off. Desirable capacitances are achieved via higher ion accessibility in paper, which originates from the strong solvent absorption of paper as well as thinner CNT film with the same mass loading resulted from the larger surface area of rough paper.

FIG. 1A shows a conductive fibrous sheet 100, consistent with an example embodiment of the present invention. A fibrous sheet 110 is conformably coated with conductive nanomaterials, such as nanomaterial ink, to form a coating 120. The coating 120 is applied, for example, using slot die, gravure, dip coating, curtain coating or other approaches. The coating 120 may include one or more of carbon nanotubes (both single walled and multi walled), metal nanowires such as Silver (Ag) nanowires, metal nanoparticles, and TCO nanoparticles (such as ITO nanoparticles).

Figure 1B:
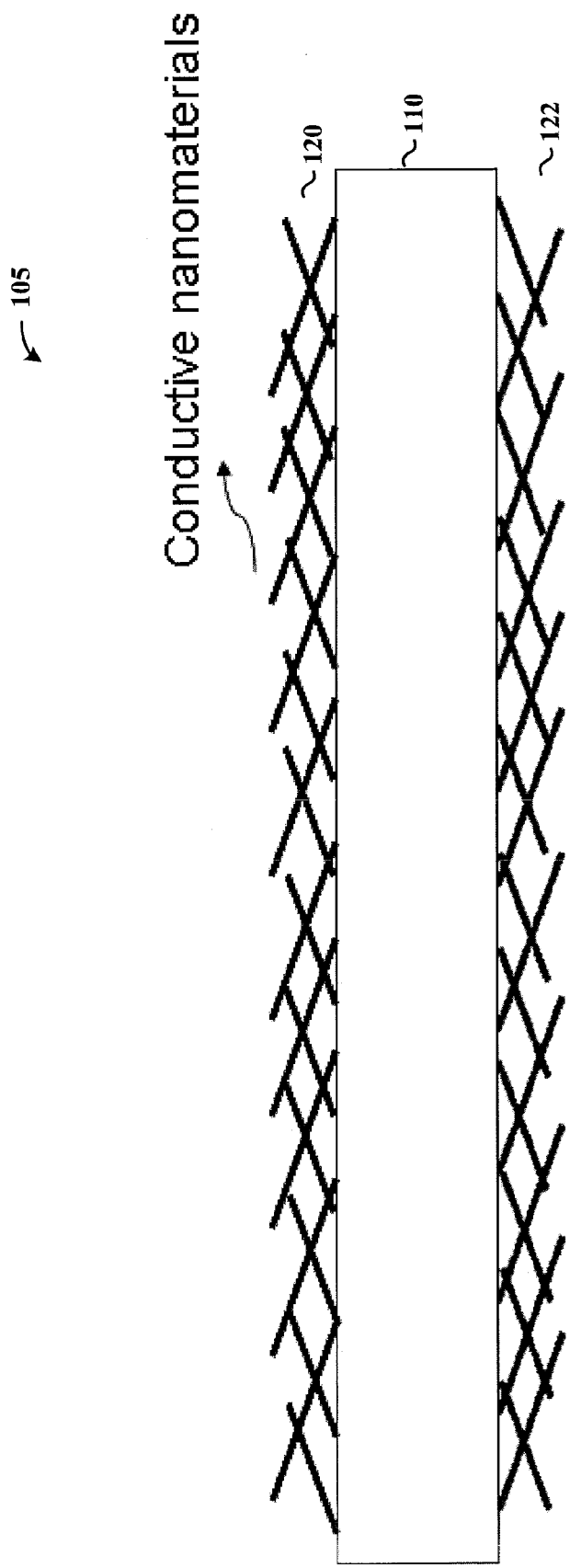
FIG. 1B shows a conductive fibrous sheet with dual conductive coatings, consistent with another example embodiment of the present invention.

FIG. 1B shows a conductive fibrous sheet 105 with dual conductive coatings, consistent with another example embodiment of the present invention. The conductive fibrous sheet 105 is similar to the conductive fibrous sheet 100 in FIG. 1, with an additional conductive coating 122 on the fibrous sheet 110, which separates the coatings 120 and 122, using the conductive fibrous sheet 100 as both a separator and a substrate to which the coatings can be coupled. Such an arrangement is applicable, for example, to use with batteries and supercapacitors.

Figure 2:
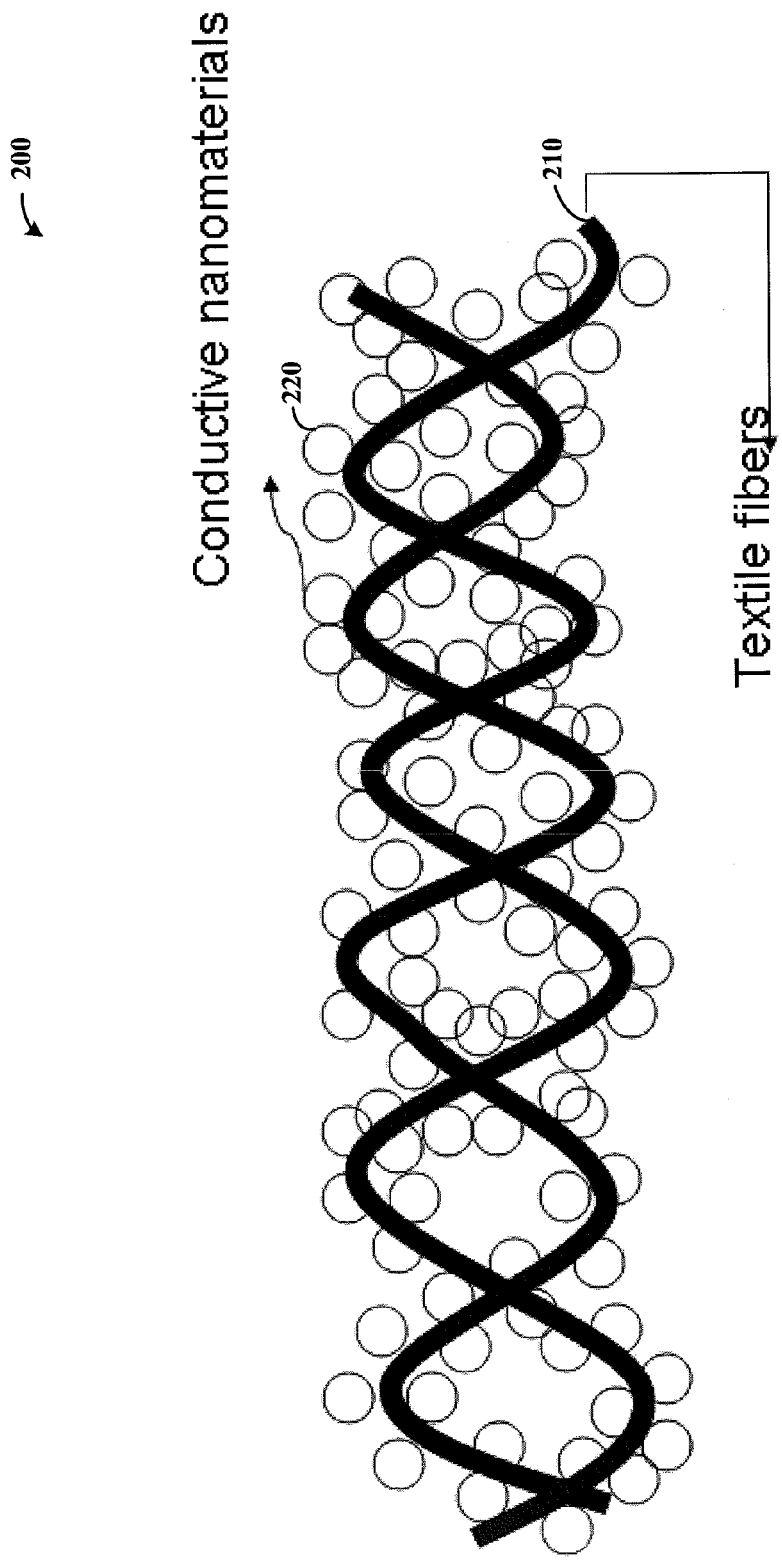
FIG. 2 shows a conductive fibrous textile sheet having fibers interwoven with nanomaterials, consistent with another example embodiment of the present invention.

FIG. 2 shows a conductive fibrous textile sheet 200 with fibers 210 interwoven with conductive nanomaterials 220, consistent with another example embodiment of the present invention. The conductive nanomaterials 220 are conformably coated onto textile material using, for example, nanomaterial inks.

Figure 3A:
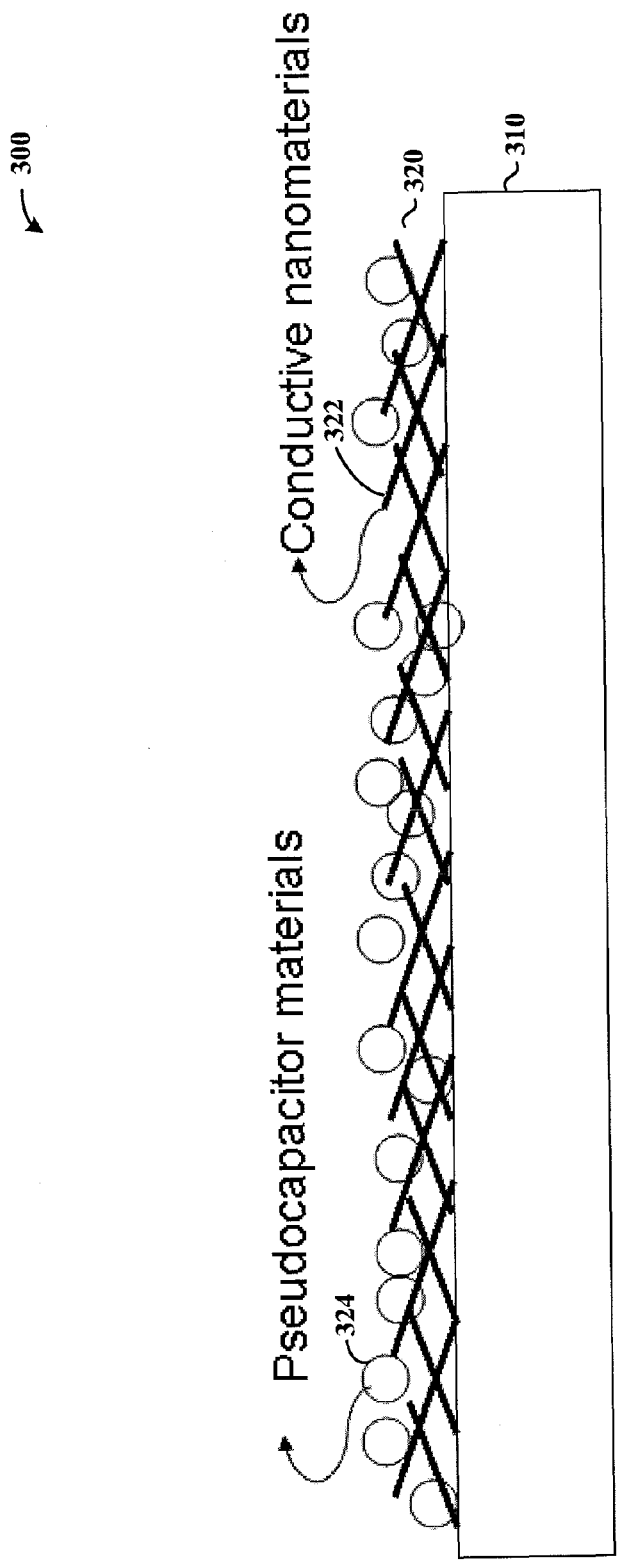
FIG. 3A shows a conductive fibrous sheet, consistent with another example embodiment of the present invention.

FIG. 3A shows a conductive fibrous sheet 300, consistent with another example embodiment of the present invention. A fibrous sheet 310 is coated with a conductive layer 320 including conductive nanomaterials 322 and pseudocapacitor materials 324, which are coupled to surface fiber materials of the fibrous sheet. The pseudocapacitor materials 324 include, for example, materials such as $RuO_2$, $MnO_2$ and other oxides, or conductive polymers. The conductive fibrous sheet 300 can be implemented in connection with various electronic devices and applications, such as with one or more of the battery and supercapacitor embodiments as described herein. The conductive nanomaterials 322 and pseudocapacitor materials 324 are used as anode and/or cathode components, such as a current collector.

Figure 3B:
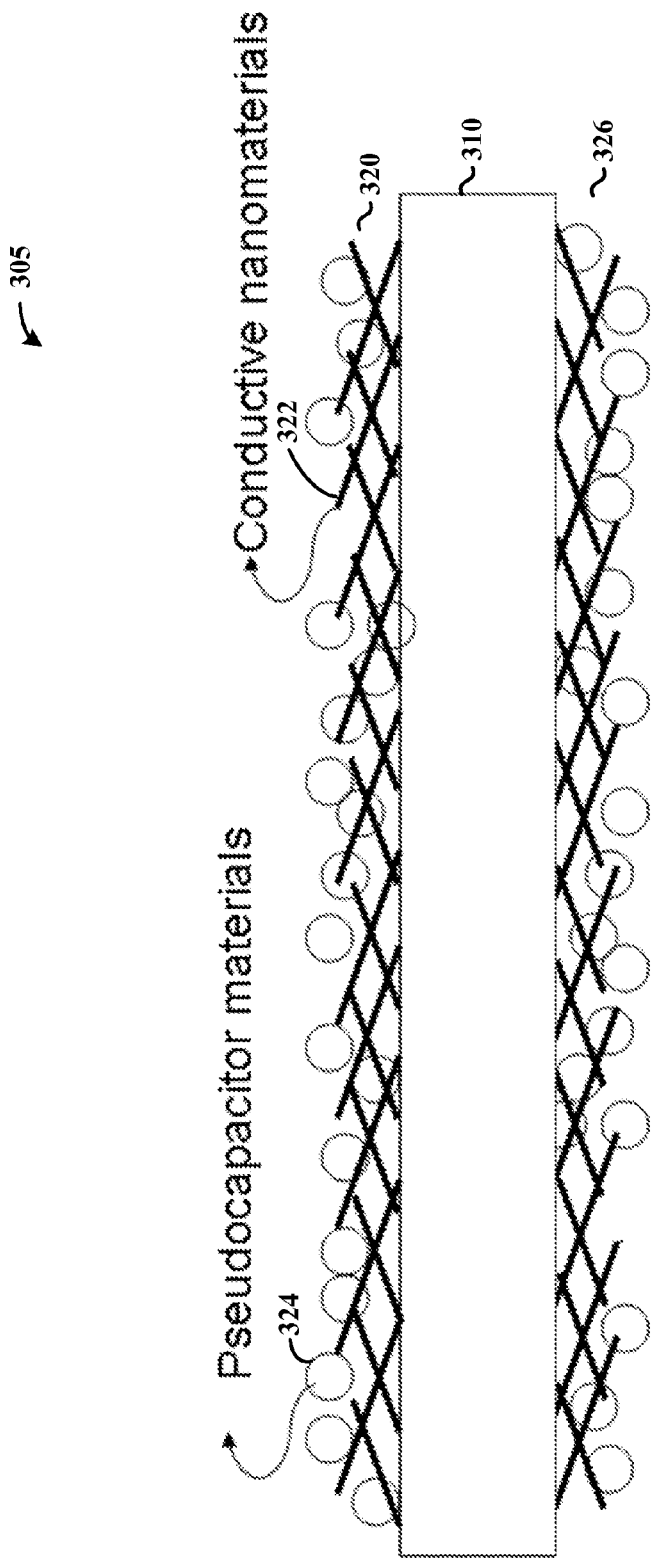
FIG. 3B shows a conductive fibrous sheet with dual coatings, consistent with another example embodiment of the present invention.

FIG. 3B shows a conductive fibrous sheet 305, similar to the sheet 300 shown in FIG. 3A and having a conductive coatings 320 and 326 of conductive nanomaterials and pseudocapacitor materials on both sides of the sheet, consistent with another example embodiment of the present invention. As with sheet 300, the sheet 305 is implemented in connection with electronic devices such as those described herein. In addition, various embodiments are directed to a supercapacitor and/or a battery implementing the fibrous sheet 310 as a separator and substrate for the respective coatings 320 and 326.

Figure 4:
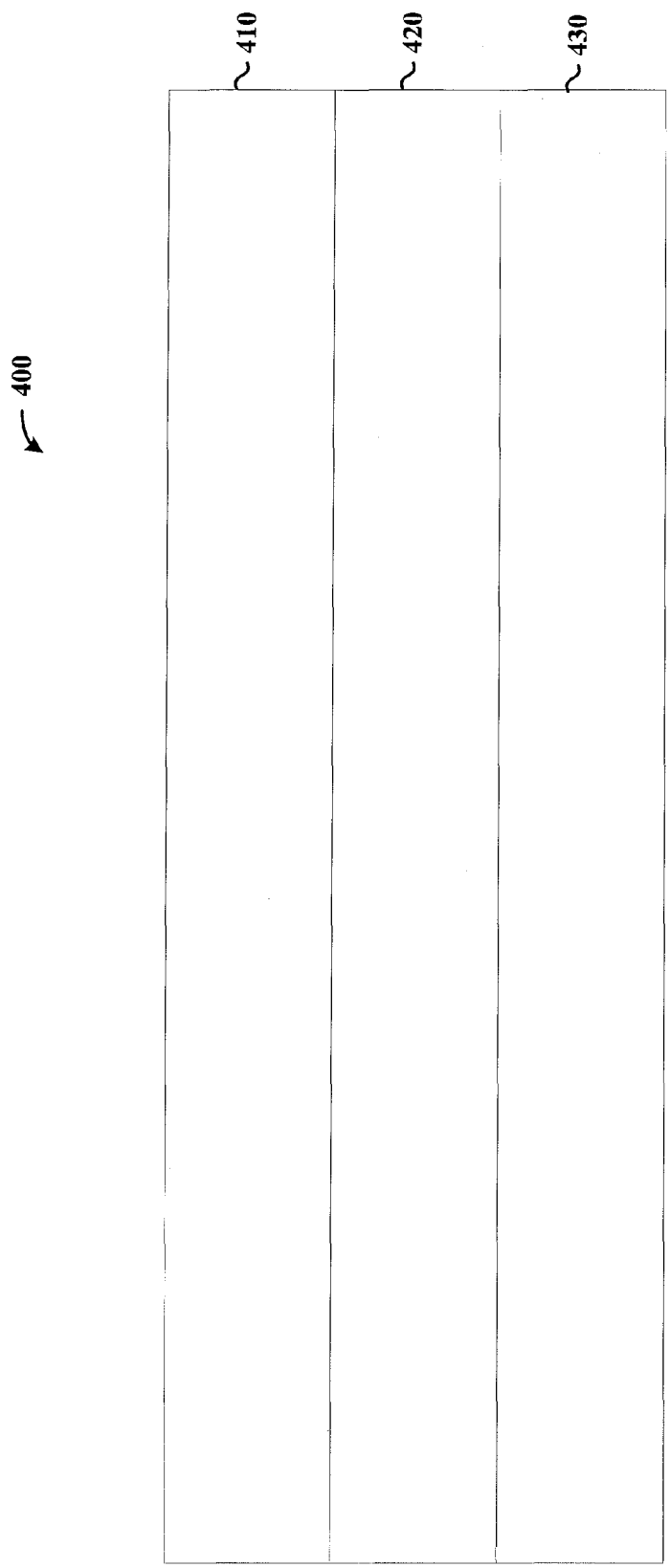
FIG. 4 shows a multi-layer arrangement including conductive sheets having a fibrous material with a conductive coating, consistent with another example embodiment of the present invention.

FIG. 4 shows a multi-layer arrangement 400 including conductive fibrous sheets having a carbon nanotube coating, consistent with another example embodiment of the present invention. Two conductive sheets 410 and 430, are separated by a separator material 420 such as another fibrous sheet (e.g., paper or textile). The conductive sheets 410 and 430 may be implemented using a carbon-nanotube type material and/or a pseudocapacitor material coated upon a paper and/or textile-based fibrous sheet such as shown in one or more of FIGS. 1-3. For instance, commercial paper can be used as the fibrous sheet, with conductive coatings applied thereto. In other implementations, the fibrous sheets and separator material 420 are stretchable material, such as a stretchable textile material.

In some applications, the multi-layer arrangement 400 is a supercapacitor, with coatings on each of the conductive sheets 410 and 430 respectively located surfaces of the sheets that face the separator material 420, and form electrodes of the supercapacitor. Such an arrangement may be formed, for example, with carbon nanotube-based conductive material on the surfaces. In some implementations, the separator material 420 and fibrous sheets are paper and form an all-paper supercapacitor (e.g., using commercial paper as discussed above). In other applications, the multi-layer arrangement 400 is a paper-based battery, again using commercial paper for the fibrous sheets.

Figure 5:
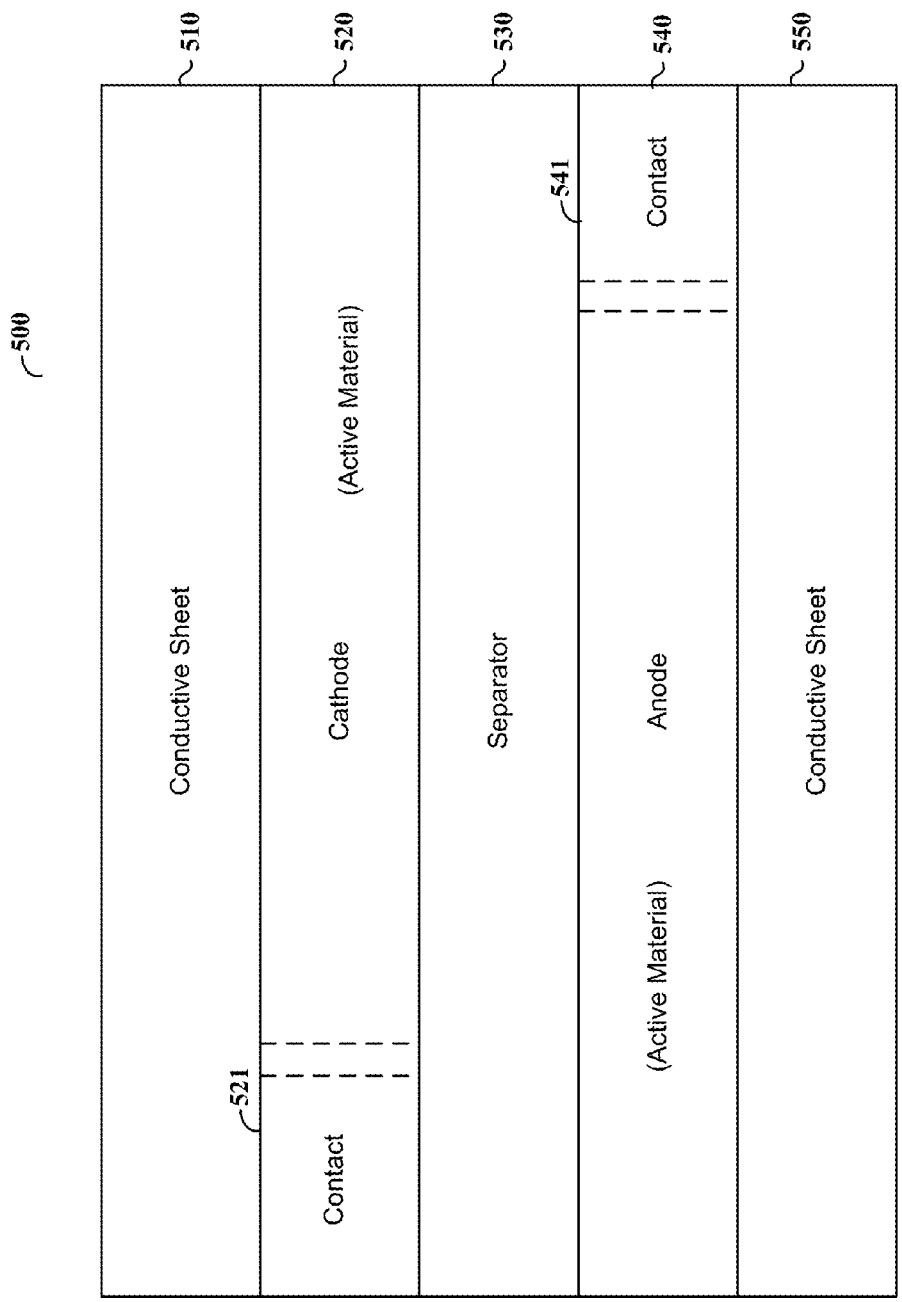
FIG. 5 shows a multi-layer battery arrangement including conductive sheets, consistent with another example embodiment of the present invention.

FIG. 5 shows a multi-layer battery arrangement 500 including conductive fibrous sheets, consistent with another example embodiment of the present invention. The arrangement 500 includes several layers 510-550. Layers 510 and 550 are conductive sheets having a fibrous sheet that is coated with a conductive material, such as shown in one of FIGS. 1-3. The conductive sheets are separated by a cathode layer 520, a separator layer 530 and an anode layer 540. The coated fibrous sheets (e.g., textile or paper, such as commercial paper) 510 and 550 work as a current collector of the battery arrangement 500, with the coated conductive surfaces of the respective sheets facing inward toward the separator, cathode layer and anode layer 530, 520 and 540. The respective anode and cathode layers store and release energy, in respective charging and discharging states, and may include one or more of various materials to facilitate this function.

In some implementations, the cathode and anode layers 520 and 540 include electrodes 521 and 541, such as respective Aluminum and Copper electrodes, that contact the coated surface of the layers 510 and 550, but are separated from active materials within each layer. Such active materials for these layers may include, for example, cathode material such as $LiMn_2O_4$, and anode material such as $Li_4Ti_6O_2$ or Carbon/Silicon nanowire. In some implementations, metal nanowire strips are used as global current collectors for large scale energy storage devices employing such an arrangement as shown in FIG. 5.

Other embodiments are directed to rechargeable batteries having coated fibrous materials to store and provide energy with high energy density. Such batteries are applicable, for example, for use in electric and/or hybrid electric vehicles. In many applications, the coated fibrous materials include a bundle, or matrix of fibers that are coated with a conductive material such as CNTs, with the resulting matrix exhibiting a porosity that is amenable to the embedding of electrolytes and an electrode material. High gravimetric energy density can be achieved in such batteries. Effectively, CNTs are used as inexpensive and light current collectors for batteries such as Li-ion batteries, to facilitate cycle life.

Battery arrangements such as the multi-layer battery arrangement 500 shown in FIG. 5 can be manufactured in a variety of manners. In one implementation, $LiMn_2O_4$ nanorods (23) and $Li_4Ti_5O_{12}$ nanopowders (~200 nm, such as that available from Süd Chemie) or Silicon/Carbon nanowires are coated onto conductive paper as cathode and anode, respectively, with Lithium foils as counter electrodes.

As used herein and unless otherwise stated, the term cathode is used to identify the positive electrode/terminal and anode is used to identify the negative electrode/terminal of a battery or cell. The term battery is used to denote a collection of one or more cells arranged to provide electrical energy. The cells of a battery can be arranged in various configurations (e.g., series, parallel and combinations thereof).

Figure 6:
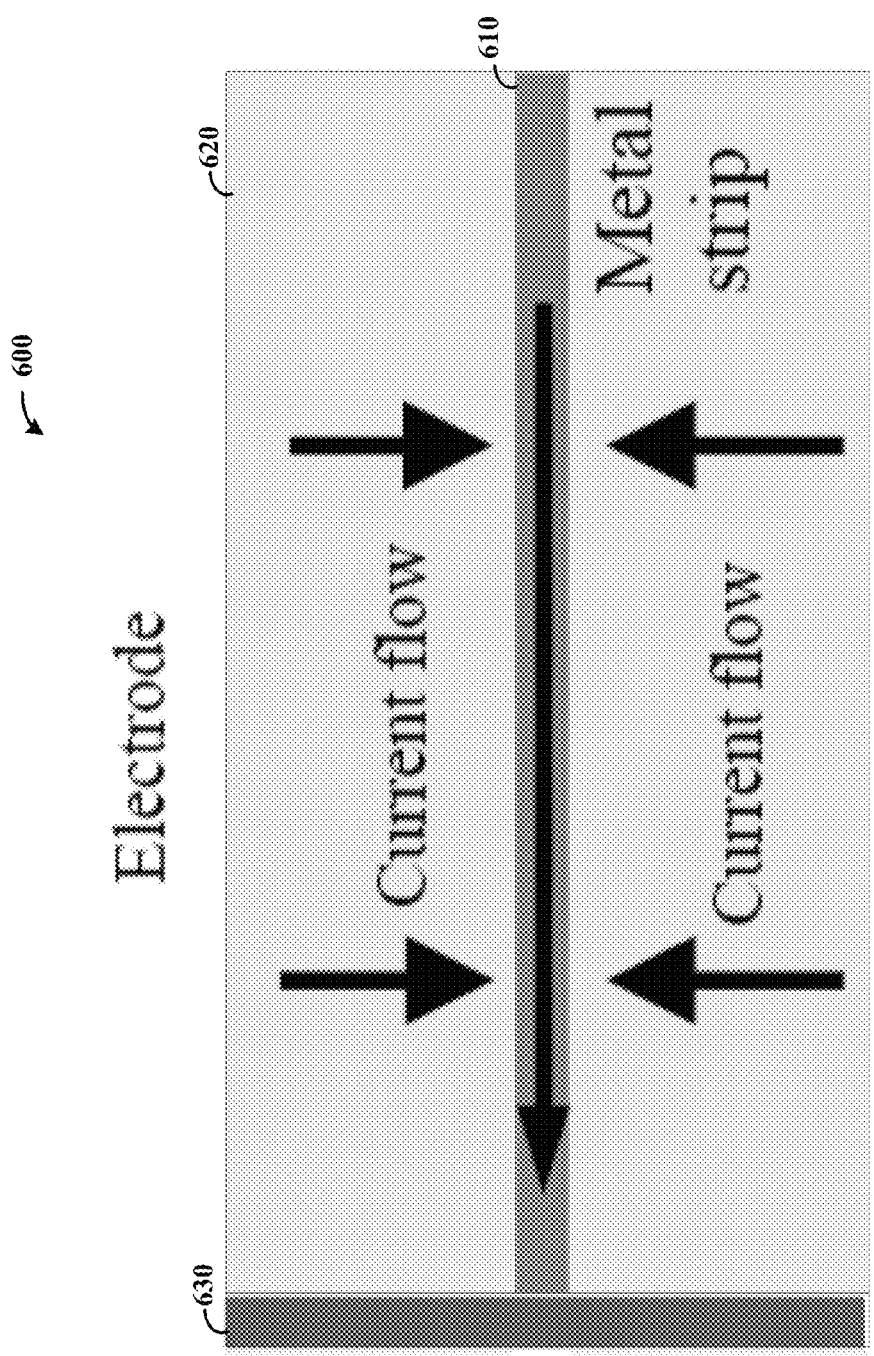
FIG. 6 shows a battery arrangement having a metal strip to decrease the resistance of current collectors, consistent with another example embodiment of the present invention.

FIG. 6 shows a battery arrangement 600 having a metal strip 610 at a long side of a rectangular film 620, to decrease the resistance of current collectors. A metal lead 630, such as that used in commercial batteries, is connected to the metal strip 610. The rectangular film 620 includes a fibrous-type sheet coated with a conductive material as described herein. When implemented with a cylindrical battery, the metal strip 610 running parallel to the long side in the middle of an electrode film permits current to flow to the metal strip first, and then to the lead 630. This highly conductive strip may, for example, include a thin metal foil or silver nanowire paint as consistent with discussion herein, or may include a grid-shaped strip (e.g., two strips 610 as shown, separated by at least about 100 nanometers). As a result, the resistance in such a configuration is much smaller than the sheet resistance of the film 620.

Various embodiments are directed to textile-based fibrous material, such as a cotton sheet or woven polyester fabric. The following discussion applies to various embodiments, one or more of which may be implemented in connection with Appendix documents filed as part of the above-referenced provisional application, including Appendix A entitled "Conductive Energy Textiles," and Appendix B entitled "Porous Textile Conductor for Supercapacitors and Batteries." These Appendix documents, together with the references cited therein, are fully incorporated herein by reference. For additional general information regarding conductive fibrous materials, and for specific information regarding conductive fibrous materials that may be implemented in connection with one or more example embodiments herein, reference may be made to the following publication relating to Appendix A: Hu et al., "Stretchable, Porous, and Conductive Energy Textiles," Nano Letters 10, 708-714, January 2010, which is also fully incorporated herein by reference. For further information generally regarding conductive paper or other fibrous material, and specifically regarding conductive fibrous materials and methods that may be implemented in connection with one or more example embodiments, reference may be made to Hu et al., "Highly conductive paper for energy-storage devices," PNAS vol. 106 no. 51, 21490-21494 (Dec. 22, 2009), which is also fully incorporated herein by reference.

In connection with such example embodiments, textile fibers such as cellulose, polyester or combinations thereof, which have hierarchy structure with complicated surface morphology, functional groups such as —OH, and high porosity, are dyed with single-walled carbon nanotube ink. For example, cotton fibers include multiple individual cotton fibrils and each fibril includes multiple microfibrils which are made of glucose chains. Such hierarchy structure is used to absorb water to the fibers and cause the fibers to swell in water. Acid treated SWNTs have —COOH function groups on the surfaces and the ends. For cellulose fibers, —COOH groups are used on SWNTs and —OH groups are used on cellulose fibers form strong hydrogen bonding. SWNTs and cellulose fibers are combined to exhibit Large van der Waals forces, using the mechanical flexibility of SWNTs and the high surface area of cellulose fibers, together with the large water absorption of the fibers which maximizes the surface contact between SWNTs and cellulose fibers. The microporous ink structure on top of the macroporous textile leads to a double porous structure, which is used to facilitate easy access of electrolyte ions to the SWNTs, which is useful, for example, in high power supercapacitor applications. For these and other embodiments, the ink may be applied using roll-to-roll techniques with slot-die or curtain coating processes as described, for example, in Tracton, A. A., *Coating Handbook* (Marcel Dekker, Inc, 2001), referenced in Appendix A as part of the above-referenced provisional application, and fully incorporated herein.

In various embodiments, a porous coated textile conductor such as described herein is coated with a material including pseudocapacitor materials such as $MnO_2$, $RuO_2$ or conducting polymers, for an energy storage device. For example, a material such as $MnO_2$ can be uniformly electrodeposited on SWNTs coated onto a textile to increase the mass loading of the pseudocapacitor while maintaining contact between SWNTs and providing a good electrical conduction path. The $MnO_2$ can be entangled with the SWNTs to facilitate such electrical contact. In some applications, a pseudocapacitor material such as $MnO_2$ is deposited along a conducting path to facilitate contact with the SWNTs.

Figure 9:
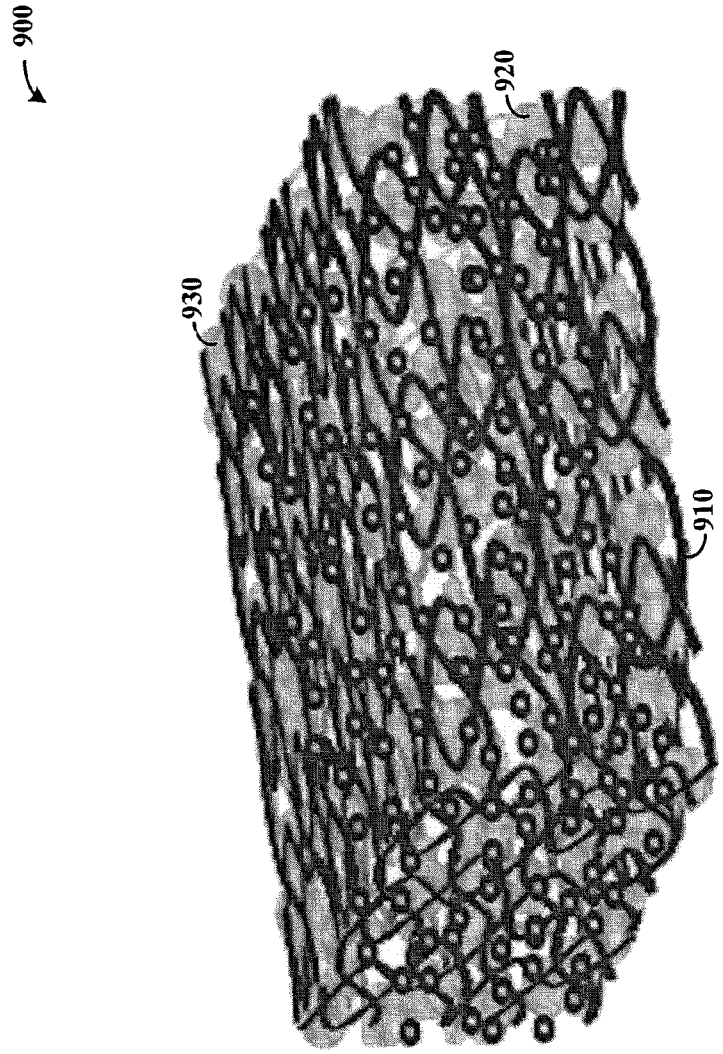
FIG. 9 shows a battery arrangement having electrodes and electrolytes embedded within a porous conductive fiber material, in accordance with another example embodiment of the present invention.

Referring to FIG. 9, a battery arrangement 900 is shown having electrodes and electrolytes embedded within a porous conductive fiber material, in accordance with another example embodiment of the present invention. The fiber material includes one or more materials as discussed herein, such as polyester (e.g., having diameter of about 20 microns), which is coated with nanoparticles to form an intertwined matrix current collector. One of the coated fibers 910 is labeled by way of example, and is intertwined and/or interconnected in a network with other fibers in the arrangement 900, forming the current collector. In some applications, one or more fibers in the material includes a bundle of smaller fibers, such as a bundle of fibers having a diameter of between about 1-50 nanometers. Such smaller fibers may be of a relatively small length, such as less than about 0.5 micrometers.

Embedded in the coated fibers 910 are a multitude of battery electrode materials represented by large spheres, and a multitude of electrolyte particles represented by relatively smaller spheres. Electrode material 920 and electrolyte particle 930 are labeled by way of example, with various such particles embedded in the three-dimensional portion of the porous conductive fiber material shown. The porosity of the fibers in the battery arrangement 900 is selected, or set, to permit the embedding of the electrolyte particles 930 throughout the cross-sectional portion of the fiber material as shown.

The following example embodiments may be implemented in connection with one or more embodiments as described hereinabove, with the claims, or as shown in the Figures. In some implementation, reference is made to various figures in Appendix C entitled "Conductive Paper for Energy Storage Devices," filed as part of the above-referenced provisional application that, together with the documents cited therein, is fully incorporated herein by reference.

In connection with various example embodiments, all-paper supercapacitors (SCs) are implemented in both aqueous and organic electrolyte phases. When tested using galvanostatic and cyclovoltammetric methods, the specific capacitances of all-paper SCs at various currents exhibit desirable capacitive values relative to pure CNT electrodes on metal substrates (6), and in some instances, exhibit capacitive values that are close to those exhibited by pseudocapacitors based on the polymer/CNT composites (19, 20). A high specific capacitance of 200 F/g is achieved for devices in sulfuric acid electrolyte. Properties of specific energy are maintained under high current operations (e.g., at ~40 A/g, capacitances larger than 70 F/g can be maintained in both aqueous and organic phases). Such high capacitances at large currents may be achieved using ion accessibility and intimate electrolyte-CNT wetting, via the porosity characteristics of the conductive fibrous materials (e.g., paper or textiles). When certain devices are operated at 3 V in organic solvent, specific energy and power reach 47 Wh/kg and 200,000 W/kg, respectively, which exceed values reported in literature (6, 16, 17). In some instances, capacitances of paper-based SCs outperform those of PET-based SCs prepared in the same way by a factor of four. The capacitances can be achieved via higher ion accessibility in paper, which originates from the strong solvent absorption of paper as well as thinner CNT film, with the same mass loading via larger surface area of rough paper. Moreover, cycle life, an important parameter in the SC operation, can be achieved over 40,000 cycles (or more) with very little decay (21). In some implementations, capacitance losses are limited to about 3% and 0.6% in sulfuric acid and organic electrolyte, respectively. When implemented with commercial paper, a conductive fibrous material exhibiting mechanical robustness without showing any crack or break for 60 days or more can be achieved. CNT films as thick as 13.5 μm (~1.33 mg/cm$^2$) can be implemented with capacitance values as high as ~122 F/g (e.g., a device with 1.33 mg/cm$^2$ CNTs is compared with the reported densest CNT assembly data (18)).

Conductive paper-supported electrodes, as consistent with one or more example embodiments, exhibit characteristics as follows. $LiMn_2O_4$ nanorods and $Li_4Ti_5O_{12}$ nanopowders achieve initial discharge capacities of 110 mAh/g and 149 mAh/g, and capacity retentions of 93% and 96% after 50 cycles at C/3, respectively. These values are comparable with metal collector-based batteries (23 -26). The Coulomb efficiency is generally ~98.5% for $LiMn_2O_4$ and over 99.5% for $Li_4Ti_5O_{12}$. In one implementation involving a paper battery, a 5 cm$^2$ full cell with conductive paper as both cathode and anode current collectors are configured for repeatedly lighting a blue LED. In addition, negligible capacity changes are noticed after 40 days, using conductive paper that is stable in electrolytes.

In some embodiments, ink and/or films are produced using carbon nanotubes, and applied in accordance with one or more embodiments as discussed herein. In one implementation, ink is formed by growing carbon nanotubes (CNTs) by laser ablation, and dispersing the CNTs with sodium dodecylbenzene sulfonate (e.g., SDBS available from Sigma-Aldrich of St. Louis, Mo.) in deionized water. Their concentrations are 10 and 1-5 mg/mL, respectively. After a bath sonication for 5 minutes, the CNT dispersion is probe-sonicated for 30 minutes at 200 W to form ink (e.g., using the VC 505 available from Sonics, Inc, of Milpitas, Calif.). Meyer rods (e.g., available from Rdspecialties, Inc. of Webster, N.Y.) are used to coat CNT ink onto Xerox paper. The sheet resistance of conductive paper is measured with a four point probe (e.g., available from EDTM, Inc. of Toledo, Ohio).

In connection with another example embodiment, silver nanowires (Ag NWs) are produced in solution-phase (27). Table 1 (below) shows a detailed recipe for silver nanowire synthesis including the function of each step, in accordance with specific implementations. In the first step, a mixture of 0.668 g poly-vinylpyrrolidone (PVP) and 20 ml ethylene glycol (EG) is heated in a flask at 170° C. Once temperature is stabilized, 0.050 g of silver chloride (AgCl) is ground finely and added to the flask for initial nucleation. After three minutes, 0.22 g of silver nitrate (AgNO3) is titrated for ten minutes. Then the flask is kept at the same temperature for another thirty minutes. After the reaction is completed, the solution is cooled down, and centrifuged three times to remove solvent, PVP, and other impurities.

TABLE 1

Step-by-step recipe for silver nanowire synthesis.

| Step | Condition | Time | Function |
|---|---|---|---|
| 1 0.668 g PVP + 20 mL EG | 170 C. | 20-30 min | Stabilizing Temperature |
| 2 0.050 g AgCl finely ground | 170 C. | 3 min | Seeds formation |

TABLE 1-continued

Step-by-step recipe for silver nanowire synthesis.

| Step | Condition | Time | Function |
|---|---|---|---|
| 3 0.220 g AgNO$_3$ + 10 mL EG | 170 C. | 10 min | Growing nanowires |
| 4 Cooking | 170 C. | 30 min | Completing growth |
| 5 Centrifuge with Methanol | 6000 rpm | 30 min | Remove EG, PVP, ions |

In connection with another example embodiment, CNTs are conformally coated on paper, in which the fibers of the paper interpenetrate each other and make the surface of paper rough. The conformal coating is observed in corners, holes, and edges of most, or all, fibers in paper. The fibers in paper form microscale pores and the coated CNTs form nanoscale pores. This approach may be carried out using, for example, an approach similar to that shown in Figures S1 and S2 of Appendix C as referenced above.

Various embodiments are directed to conductive paper having a variety of characteristics. In some embodiments, a conductive CNT coating is applied to non-woven polyester/cellulose paper (e.g., as available from Berkshire, Inc. of Great Barrington, Mass.), and exhibits stable resistance characteristics through exposure to water such as soaking, rinsing and squeezing, and after drying (e.g., at 80° C. for 10 minutes). The CNT coating, as with other coatings as discussed herein, can be applied using one or more coating methods such as dipping and drying and electrodeposition. Various such embodiments are directed to conductive paper having a sheet resistance as exhibited in Figure S3A of Appendix C as referenced above. The local resistance refers to the resistance within a piece of continuous film with size around a few mm, and the global resistance indicates that over many pieces of such local films. Other embodiments are directed to conductive paper batteries configured for stability in organic electrolyte (e.g., 1M LiPF$_6$ in EC/DEC) for months. As exemplified in Figure S9 of Appendix C (referenced above), the conductive paper functions well as the current collector for Li$_4$Ti$_5$O$_{12}$ in 1M LiPF$_6$ in EC/DEC for 180 cycles at C/3, which corresponds to about 1.5 months, with a capacity retention of about 95%.

Conductive materials may be applied to fibers and/or paper using a variety of approaches. In some embodiments, CNT films are Mayer rod coated by dropping CNT ink onto a paper surface, and a Mayer rod is rolled to the other end of the paper. The thickness of dried CNT film can be controlled by the ink concentration and the wire size of Meyer rods. To write with Chinese calligraphy, non-woven polyester/cellulose paper (DURX 670, Berkshire Inc) is used to achieve enough absorption of ink into paper. Also, to realize direct writing with CNT ink, a highlight pen is disassembled and the original ink is replaced with CNT ink. An example approach to the writing of CNT ink using the highlight pen is shown in Figure S3B of Appendix C as referenced above. The paper substrate absorbs CNT ink facilely, while flat solid substrates such as PET do not absorb the ink at all. The resistance of such directly written CNT patterns with pen is around 300 Ohm/sq for paper and around 1 Mohm/sq for PET.

Conductive fibers and fiber sheets as discussed herein are formed with a CNT-Ag NW Interface and Contact Resistance as follows, in connection with various embodiments. An Ag nanowire (NW) coating is formed on CNT films, where Ag NWs are used as global current collectors and CNTs as local current collectors for large scale energy storage devices. The effective thicknesses of CNT and Ag NW are 160 nm and 400 nm, respectively. Reference may be made to the inset of Figure S4D of Appendix C (referenced above), which shows a scheme for measuring the contact resistance between CNTs and Ag NWs. The width of CNT film is 6 mm. The Rs for CNTs and Ag NWs are 92 Ohm/sq and 2 Ohm/sq, respectively. Ag NW films with 1.5 mm in width and 6 mm in length are coated on top of CNT films. The contact resistance, extracted from the linear fit in the graph of resistance versus distance between Ag NW electrodes (FIG. S4D), is 0.83 ohm for 0.09 cm$^2$, which corresponds to a specific contact resistance of 0.075 Ohm·cm$^2$ for this measurement configuration. Consequently, the contact resistance is negligible compared to the sheet resistance of AgNW film, and thus not a limiting factor in charge transfer.

Supercapacitor cells are prepared as follows, in connection with one or more embodiments. For aqueous electrolyte devices, two pieces of CNT conductive paper are attached on glass slides. CNT films are used as both electrodes and current collectors. At the end of CNT paper, a small piece of platinum is clipped with CNT conductive paper by a toothless alligator clip for electrical reach-out to a battery analyzer (MACCOR 4300). Both glass slides are assembled with a separator (Whatman 8 μm filter paper) sandwiched. The paper assembly is wrapped with para film, and then dipped in the electrolyte solution. The active area overlapped by both CNT conductive paper is 1 cm$^2$.

For organic electrolyte devices, cells are assembled by locating a separator soaked with a standard battery electrolyte (1 M LiPF6 in ethylene carbonate: diethylene carbonate=1:1 v/v, Ferro) between two CNT conductive paper substrates. The active area overlapped by both CNT conductive paper substrates is also 1 cm$^2$. The entire assembly is sealed in a poly-bag (e.g., available from Sigma-Aldrich). As in aqueous cells, small pieces of platinum are attached to the end of CNT conductive paper for an electrical contact. The current collectors come out through the sealed edges of poly-bags, and then are connected to the battery analyzer. All steps in the cell preparation are done in an argon filled glove box (oxygen and water contents below 1 and 0.1 ppm, respectively).

Mass loading can be about 72~270 μg per cm$^2$ and larger mass loading up to 1.35 mg per cm$^2$ is also tested, and the capacitances are plotted in Figure S6 of Appendix C (referenced above).

Capacitance, energy density, and power density of various embodiments are characterized by galvanostatic measurements as follows. 0.02~20 mA per cm$^2$ are applied to cells while potentials between both electrodes sweep between cut-off values (0≤V≤0.85~1 V in aqueous phase, 0≤V≤2.3~3 V in organic phase). Voltages are recorded every 0.01~0.2 second.

Characteristics of conductive fibers are set or otherwise characterized using the following approach, in connection with other example embodiments. In galvanostatic data, IR drop at the top cut-off potential and slope at a discharge curve are used to obtain the power and energy density, respectively. The power is calculated by using $$P=V^2/[4RM],$$

where V is the cut-off potential, R is the internal resistance, and M is the total mass of CNTs on both sides. The internal resistance is evaluated from the voltage drop at the beginning of each discharge:

$$R=\Delta ViR/2i,$$

where ΔViR is the voltage drop between the first two points in the voltage drop at its top cut-off. This voltage drop is also referred to as iR drop. i is the current applied. The specific capacitance (Cs) is calculated by using $$Cs = i/-[\Delta V/\Delta t]m = i/-(slope \cdot m),$$

where i is the current applied, the slope is that of the discharge curve after the iR drop, and m is the mass of CNTs on one electrode. Similarly, energy density (E) is calculated using $$E = 0.5CV^2/M,$$

where V and M are the same notations as the power calculation, and C is the measured capacitance. Various calculations are consistent with those described elsewhere in reference 28 below.

Figure 7:
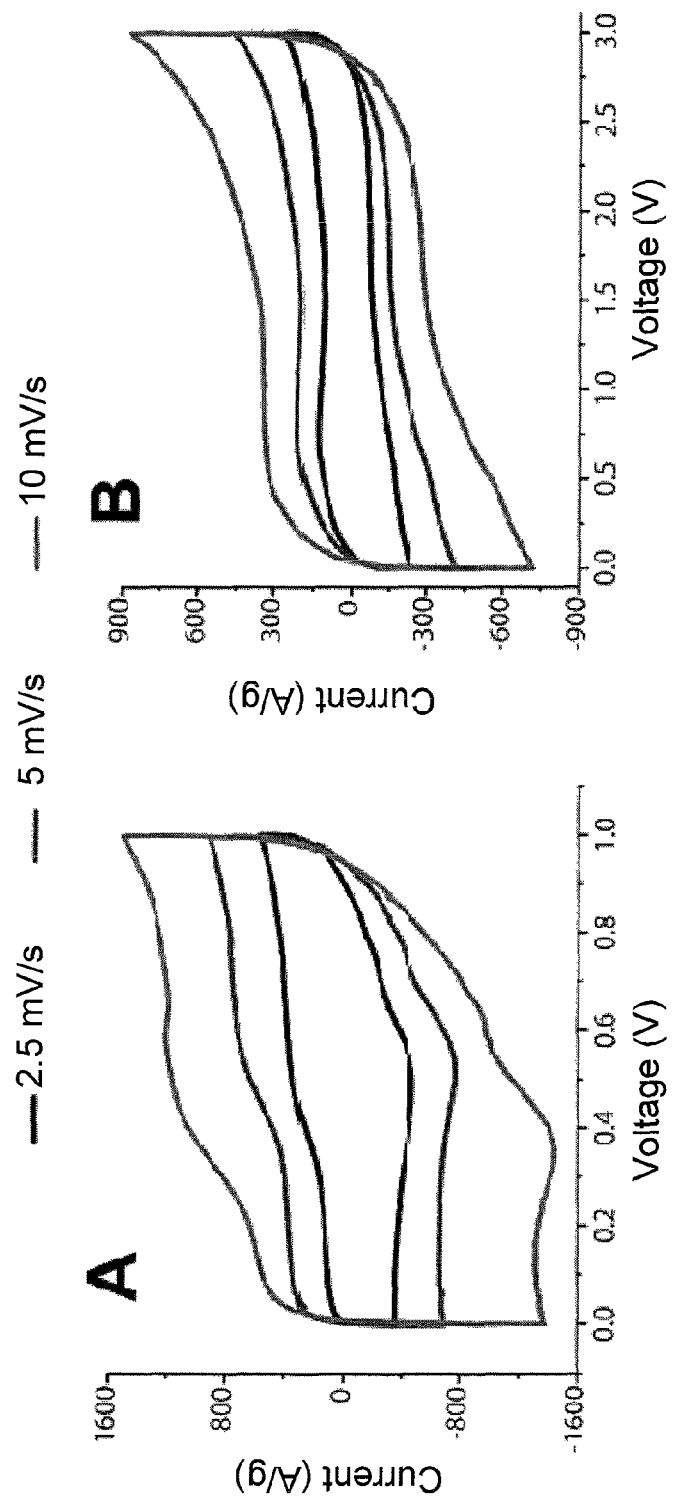
FIG. 7 shows Cyclovoltammetry (CV) as data measured at different sweep rates, consistent with another example embodiment of the present invention.

Referring to FIG. 7, Cyclovoltammetry (CV) is shown as data measured at different sweep rates in (A) 1 M sulfuric acid and (B) organic electrolyte, in accordance with other example embodiments.

Figure 8:
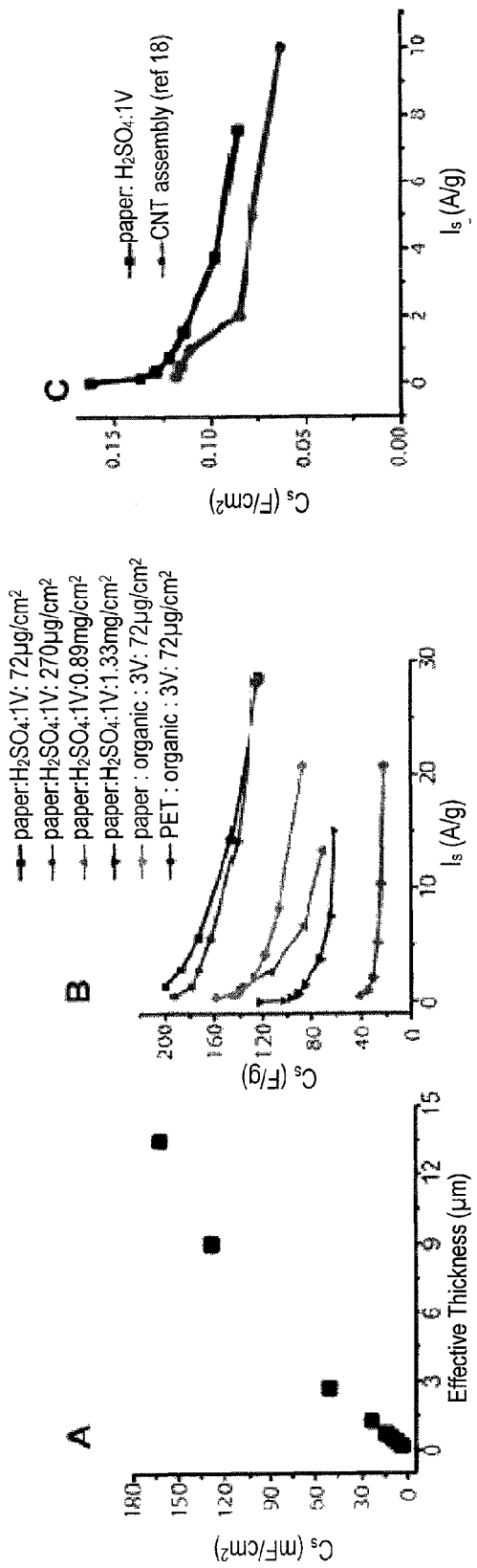
FIG. 8 shows thickness dependence, mass loading dependence and areal capacitance of a coated fiber-based sheet, consistent with another example embodiment of the present invention.

FIG. 8 shows characteristics of an example supercapacitor, in accordance with one or more example embodiments. In FIG. 8(A), the thickness dependence of specific capacitance per area is shown for samples measured in 1 M sulfuric acid and a 1 V range. FIG. 8(B) shows the mass loading dependence of gravimetric capacitance. The PET device with the lowest mass loading is plotted together for comparison. FIG. 8(C) shows areal capacitance at various currents, plotted with exemplary (highly dense) CNT solid data (e.g., similar to that shown in reference 18, cited below).

CNT conductive paper with different CNT film thicknesses are prepared and tested, in accordance with various embodiments, using an approach such as that shown in Figure S6 of Appendix C (referenced above). The capacitance per area increases with film thickness. A device having a density of 1.33 mg/cm$^2$ shows larger gravimetric capacitances than those of a PET device with about 20 times lower mass loading. Paper characteristics of strong binding of CNTs and easy ion accessibility are thus applicable to thicker films.

Various CNT conductive paper devices as discussed herein can be implemented to achieve an areal capacitance, such as that shown in Figure S6C of Appendix C as referenced above (with mass loading of 1.33 mg/cm$^2$). Related values are compared with reported data from the highest density CNT assembly in FIG. 4C of reference 18, cited below. Volumetric capacitances of the CNT assembly are converted to areal capacitances considering the assembly length (100 μm). In embodiments exhibiting a film thickness (e.g., about 13.3 μm) that is about ten times smaller than that of the highly dense CNT assembly, conductive paper shows large areal capacitance at all current values.

In connection with other example embodiments, batteries are fabricated as follows. LiMn$_2$O$_4$ nanorods are synthesized (e.g., according to reference 23 below), such as by dissolving 8 mmol MnSO$_4$·H$_2$O and 8 mmol (NH$_4$)$_2$S$_2$O$_8$ in 20 mL deionized water, and transferring the solution to a 45 mL Teflon-lined stainless steel vessel (e.g., available from Parr Instrument Co. of Moline, Ill.). The vessel is sealed and heated at 150° C. for 12 hours to obtain β-MnO$_2$ nanorods. As-synthesized MnO$_2$ nanorods are mixed and ground with lithium acetate (Aldrich) at a molar ratio of 2:1. About 1 mL methanol is added to make a uniform slurry mixture, and the mixture is sintered at 700° C. for 10 h under air to obtain LiMn$_2$O$_4$ nanorods. Li$_4$Ti$_5$O$_{12}$ powder is used as received from Süd Chemie of Munich, Germany.

In some embodiments, electrodes for electrochemical analysis are prepared by making a slurry of 70 wt % active materials, 20 wt % Super P, and 10 wt % polyvinylidene fluoride (PVDF) binder in N-methyl2-pyrrolidone (NMP) as the solvent. The slurry is coated onto a piece of conductive CNT paper by an applicator and then dried at 100° C. in a vacuum oven overnight.

Half-cell tests of both cathode (LiMn$_2$O$_4$) and anode (Li$_4$Ti$_5$O$_{12}$) are carried out inside a coffee bag (pouch) cell assembled in an argon-filled glovebox (oxygen and water contents below 1 and 0.1 ppm, respectively). Lithium metal foil (Alfa Aesar) is used as the anode. A 1 M solution of LiPF$_6$ in ethylene carbonate/diethyl carbonate (EC/DEC, 1:1 v/v, Ferro Corporation) is used as the electrolyte with separators from Asahi Kasei. The charge/discharge cycles are performed at different rates at room temperature, where 1 C is 148 mA/g for LiMn$_2$O$_4$ and 175 mA/g for Li$_4$Ti$_5$O$_{12}$, respectively. The voltage range is 3.5-4.3 V for LiMn$_2$O$_4$ and 1.3-1.7 V for Li$_4$Ti$_5$O$_{12}$. Tests are performed by either Bio-Logic VMP3 battery testers or MTI battery analyzers.

Fuel cells are fabricated as follows, in connection with various embodiments. To achieve the high voltage to light a blue LED, silicon/carbon core/shell nanowires are used as an anode. The core/shell nanowires are synthesized by CVD. Carbon nanofibers (e.g., from Sigma Aldrich) is loaded into a tube furnace and heated to 500° C. Silane gas is introduced and decomposed onto carbon nanofibers. The weight ratio of silicon shell to carbon core is about 2:1. As-synthesized Si/C nanowires are dropped onto a CNT paper to form an anode. After this step, cathode (LiMn$_2$O$_4$) and anode (Si/C nanowires) films are assembled to make a 5 cm$^2$ pouch cell as described above and it is used to light the blue LED many times.

In connection with other embodiments, conductive paper batteries exhibit gravimetric energy density in accordance with the following. In Li-ion batteries, the capacity density is 3-5 mAh/cm$^2$, which corresponds to 2136 mg/cm$^2$ LiCoO$_2$ (140 mAh/g) and 10-17 mg/cm$^2$ graphite (~300 mAh/g). The current collector includes 20~25 μm Al foil (2.7 g/cm$^3$) and 10-20 μm Cu foil (9.0 g/cm$^3$)(S4). In contrast, the density of paper is ~1.0 g/cm$^2$ and the loading of CNTs is 0.2 mg/cm$^2$ for a sheet resistance of 20 Ω/sq. The lower density of CNT conductive paper leads to higher gravimetric energy density.

Table 2 shows a comparison of the weight of exemplary Li-ion type batteries and conductive paper batteries as formed in connection with various embodiments. For illustrative purposes, the thickness of paper is assumed to be the same as that of metal current collectors. In some implementations, the weight saved in using a paper-based battery as discussed herein, is as high as about 30%. The unit for all numbers in the table is milligram.

TABLE 2

| Capacity Loading | 3 mAh/cm$^2$ | | 5 mAh/cm$^2$ | |
|---|---|---|---|---|
| | Li-ion type | Paper | Li-ion type | Paper |
| Cathode (LiCoO$_2$) | 21 | 21 | 36 | 36 |
| Cathode Collector/20 im | 5.4 | 2.2 | 5.4 | 2.2 |
| Anode (Graphite) | 10 | 10 | 17 | 17 |
| Anode Collector/15 im | 13.4 | 1.7 | 13.4 | 1.7 |
| Total Weight | 49.8 | 34.9 | 71.8 | 56.9 |
| Weight Gain (%) | | 29.9 | | 20.8 |

FIG. 6 as discussed above shows a battery arrangement having a metal strip 610 at the long side of the rectangular film to decrease the resistance of current collectors, in accordance with one or more embodiments. The line 630 on left of the figure is a metal lead, which may be implemented in a manner similar to that used in commercial batteries. A highly conductive strip is arranged in parallel to the long side in the middle of an electrode film, and facilitates current flow to the metal strip first and then to the lead. This highly conductive strip may be formed using, for example, thin metal foil or silver nanowire (Ag NW) paint. As a result, the resistance in such configuration is much smaller than the sheet resistance of conductive paper. In a cylindrical cell, the size of an electrode is about 5 cm by 50 cm, as discussed in reference 29 below.

In some implementations, 20 $\Omega$/sq conductive paper is used as the current collector, so the resistance of each half electrode film is 20 $\Omega$/sq/(50 cm/2.5 cm)/2=0.5$\Omega$. The factor of 2 comes from the fact that current is generated uniformly through the whole electrode. Since the two half electrode films are in parallel, the total resistance of a single electrode can further decrease to 0.5$\Omega$/2=250 m$\Omega$, which is within the same order of commercial Li-ion batteries (50-100 m$\Omega$). In some implementations, the process of making paper current collector is carried out to fabricate 1 $\Omega$/sq CNT paper using one or more of: optimization of coating process, moderate increases of CNT loading, selective use of metallic CNTs, and mixing with metal nanowires. In such implementations, the total resistance of two paper electrodes is 12.5 m$\Omega$*2=25 m$\Omega$, which is much smaller than the internal resistance in practical Li-ion batteries. Accordingly, the resistance of CNT conductive paper can be set using one or a combination of various methods.

References

For general information regarding a variety of fields that may relate to one or more embodiments of the present invention, and for specific information regarding the application of one or more such embodiments, reference may be made to the following documents, which are fully incorporated herein by reference. Various ones of these references are further cited above via corresponding numerals, and may be implemented in connection with one or more example embodiments.

1. D. V. Talapin, C. B. Murray, *Science* 310, 86 (October, 2005).
2. X. F. Duan et al., *Nature* 425, 274 (September, 2003).
3. J. H. Ahn et al., *Science* 314, 1754 (December, 2006).
4. J. Y. Kim et al., *Science* 317, 222 (July, 2007).
5. U. Bach et al., *Nature* 395, 583 (October, 1998).
6. K. H. An et al., *Advanced Materials* 13, 497 (April, 2001).
7. P. Poizot, S. Laruelle, S. Grugeon, L. Dupont, J. M. Tarascon, *Nature* 407, 496 (September, 2000).
8. I. E. S. Edwards, N. G. L. Hammond, C. J. Gadd, Cambridge University Press (1975).
9. J. C. Roberts, *Springer* (1996).
10. M. F. Islam, E. Rojas, D. M. Bergey, A. T. Johnson, A. G. Yodh, *Nano Letters* 3, 269 (February, 2003).
11. K. Kordas et al., *Small* 2, 1021 (August, 2006).
12. Materials and methods are available as supporting material on Science Online.
13. E. B. Gutoff, E. D. Cohen, John Wiley & Sons, Inc Hoboken, N.J. (2006).
14. M. Endo et al., *Nature* 433, 476 (February, 2005).
15. V. L. Pushparaj et al., *Proceedings of the National Academy of Sciences of the United States of America* 104, 13574 (2007).
16. M. Kaempgen, C. K. Chan, J. Ma, Y. Cui, G. Gruner, *Nano Letters* 9, 1872 (2009).
17. O. Kimizuka et al., *Carbon* 46, 1999 (November, 2008).
18. D. N. Futaba et al., *Nature Materials* 5, 987 (2006).
19. K. H. An et al., *Journal of the Electrochemical Society* 149, A1058 (August, 2002).
20. A. Malinauskas, J. Malinauskiene, A. Ramanavicius, *Nanotechnology* 16, R51 (October, 2005).
21. For the cycling test in both phases of electrolyte, ~5 A/g was applied. The cut-off potentials for the sulfuric acid and organic electrolyte are 0.85 and 2.3 V, respectively.
22. B. J. Landi, M. J. Ganter, C. M. Schauerman, C. D. Cress, R. P. Raffaelle, *Journal of Physical Chemistry C* 112, 7509 (May, 2008).
23. D. K. Kim et al., *Nano Letters* 8, 3948 (November, 2008).
24. M. M. Thackeray, P. J. Johnson, L. A. Depicciotto, P. G. Bruce, J. B. Goodenough, *Materials Research Bulletin* 19, 179 (1984).
25. L. Kavan, M. Gratzel, *Electrochemical and Solid State Letters* 5, A39 (2002).
26. K. Zaghib, M. Simoneau, M. Armand, M. Gauthier, *Journal of Power Sources* 81, 300 (1999).
27. Y. G. Sun, B. Mayers, T. Herricks, Y. N. Xia, *Nano Letters* 3, 955 (July, 2003).
28. E. Frackowiak, *Physical Chemistry Chemical Physics* 9, 1774 (2007).
29. B. A. Johnson, R. E. White, *Journal of Power Sources* 70, 48 (1998).

Based upon the above discussion and illustrations, those skilled in the art will readily recognize that various modifications and changes may be made to the present invention without strictly following the exemplary embodiments and applications illustrated and described herein. Such modifications and changes may include, for example, incorporating one or more aspects described in the above references and/or applying one or more embodiments thereto, combining embodiments. These and other modifications do not depart from the true spirit and scope of the present invention, including that set forth in the following claims.

What is claimed is:

1. An electronic device comprising:
    a fibrous planar material including a plurality of fibers coated by a conductive coating of carbon nanotubes on respective surfaces of the plurality of fibers and forming a matrix of conductive-coated fibers and including electrolyte molecules that occupy openings between the conductive-coated fibers and that have a cross-section that is less than a size of the openings;
    a coating of metal nanowires on the coating of carbon nanotubes; and
    conductive materials embedded in the fibrous planar material and between the plurality of fibers.

2. The device of claim 1, wherein the conductive coating is between about 5-500 nanometers thick.

3. The device of claim 1, wherein a majority of the conductive-coated fibers are separated from other ones of the conductive-coated fibers by at least about 1 micrometer and wherein the metal nanowires are silver nanowires configured as a global current collector of the device, and the coating of carbon nanotubes is configured as a local current collector of the device.

4. The device of claim 1, wherein the conductive coating includes conductive and pseudocapacitor materials respectively coupled to the fibers.

5. The device of claim 1, wherein the fibrous planar material includes at least one of: cellulose, cotton, and textile.

6. The device of claim 1, wherein the fibrous planar material includes at least two of: cellulose, cotton and textile.

7. The device of claim 1, wherein at least one of the fibers is a bundle of fibers having diameters between 1 and 50 nanometers.

8. The device of claim 1, wherein the conductive materials have a shape selected from the group consisting of: a sphere, cube, hexagon, triangle, wire, and a tube.

9. The device of claim 1, wherein the conductive materials have a heterostructure that consists of a combination of two or more materials within a nanostructure.

10. The device of claim 1, wherein the conductive materials include at least one material selected from the group consisting of: a semiconductor, a metal and a material having a resistivity in the range of $10^5$ ohm cm to $10^{-7}$ ohm cm.

11. The device of claim 1, wherein the electrolyte molecules are selected from the group consisting of: an aqueous molecule and an organic electrolyte molecule in the fibrous planar material.

12. The device of claim 1,
wherein the device includes a battery having:
a current collector including the fibrous planar material having the plurality of fibers coated by a conductive coating of carbon nanotubes;
the coating of metal nanowires on the coating of carbon nanotubes;
the conductive materials embedded in the fibrous planar material;
a plurality of battery electrode particles embedded in the conductive-coated fibers.

13. The device of claim 12,
wherein at least a portion of the majority of the fibers is spaced at a distance from other fibers that is larger than a cross-sectional distance of the electrolyte molecules and electrode particles.

14. The device of claim 1, wherein the device further comprises
an anode-side fibrous planar sheet, including the fibrous planar material coated by the conductive coating of carbon nanotubes;
the coating of metal nanowires on the coating of carbon nanotubes; and
the conductive materials embedded in the fibrous planar material and between the plurality of fibers;
an anode layer on the anode-side fibrous planar sheet;
an electrolytic separator layer on the anode layer;
a cathode layer on the separator layer; and a cathode-side fibrous planar sheet having a plurality of fibers and conductive nanoparticles that coat the fibers.

15. The device of claim 14,
wherein the conductive nanoparticles on the cathode-side fibrous planar sheet include a conformal conductive coating on a surface of the cathode-side fibrous planar sheet facing the cathode layer.

16. The device of claim 14,
wherein the carbon nanotubes on the anode-side fibrous planar sheet include a conformal conductive coating on a surface of the anode-side fibrous planar sheet facing the anode layer.

17. The device of claim 14,
wherein the conductive nanoparticles on the cathode-side fibrous planar sheet include a conformal conductive coating on a surface of the cathode-side fibrous planar sheet facing the cathode layer, and
the carbon nanotubes on the anode-side fibrous planar sheet include a conformal conductive coating on a surface of the anode-side fibrous planar sheet facing the anode layer.

18. The device of claim 14,
wherein the anode layer has a conductive electrode that is connected to the carbon nanotubes of the anode-side fibrous planar sheet, and separated from other material in the anode layer.

19. The device of claim 14,
wherein the cathode layer has a conductive electrode that is connected to conductive nanoparticles of the cathode-side fibrous planar sheet, and separated from other material in the cathode layer.

20. The device of claim 14, further including
anode and cathode electrodes, respectively connected to the carbon nanotubes of the anode-side fibrous planar sheet and the conductive nanoparticles of the cathode-side fibrous planar sheet, and insulated from anode and cathode materials respectively in the anode and cathode layers.

21. The device of claim 1, wherein the device further comprises:
a planer sheet having:
the fibrous planar material coated by the conductive coating of carbon nanotubes;
the coating of metal nanowires on the coating of carbon nanotubes; and
the conductive materials embedded in the fibrous planar material and between the plurality of fibers;
a conductive lead at an end of the planar sheet; and
a conductive strip coating on the planar sheet and extending across the sheet to collect current from the conductive coating of carbon nanotubes and conduct the collected current to the conductive lead.

22. The device of claim 21,
wherein the planar sheet has opposing surfaces and extends to a length and width in a plane, the length and width being an order of magnitude greater than the thickness of the planar sheet between the opposing surfaces; and
the conductive coating of carbon nanotubes forms a conformal conductive coating on the planar sheet.

23. The device of claim 21,
wherein the conductive coating of carbon nanotubes forms an intertwined matrix of conductive-coated fibers.

24. The device of claim 21, wherein the conductive strip coating is a paint having a conductive material dispersed therein.

25. The device of claim 21, wherein the conductive strip coating is arranged in a grid having at least two strips separated by at least about 100 micrometers.

26. The device of claim 1,
wherein the device includes a battery having a current collector including the fibrous planar material coated by the conductive coating of carbon nanotubes and having:
the coating of metal nanowires on the coating of carbon nanotubes; and
the conductive materials embedded in the fibrous planar material and between the plurality of fibers;
the fibrous planar material further having:
a plurality of battery electrode particles embedded in the conductive-coated fibers; and
a metal strip configured and arranged to decrease resistance of the current collector.

* * * * *